Aug. 10, 1965

R. T. CORRY 3,200,211

GEOMETRIC SUBSTITUTION BOXES

Filed April 23, 1963

INVENTOR.
ROBERT T. CORRY

BY Emery Whittemore Sandoe & Graham

ATTORNEYS 3,200,211

GEOMETRIC SUBSTITUTION BOXES

Robert T. Corry, P.O. Box 907, New Canaan, Conn.

Filed Apr. 23, 1963, Ser. No. 274,982
3 Claims. (Cl. 200—11)

This invention relates to electrical instruments and, more particularly, to improved selector switch arrangement for applications such as geometric substitution boxes in which a desired plurality of function values is obtained with function elements numbering less than the number of values selectable.

Substitution boxes, in which a multiposition selector switch is provided to select a function value from a plurality of values, are known to the art and are used extensively in, for example, laboratory and test work. It is often desirable that the function values, as for example, a pluarality of resistance values, be related in a geometric series, as for example, the series specified by the RTMA Standard GEN-102. It should be noted that the term geometric series as used herein is used in the conventional sense and applies to series which are useful in approximations of mathematically precise geometric series. Also, since the substitution box is a conventional and important application for such switching arrangements, it will be referred to herein as the preferred embodiment, without limiting application of the invention to related instrumentation.

Customarily, substitution boxes of the geometric series type comprise a multiposition switch which couples the instrument output terminals across a single function element of the desired value at each switch position. Thus, the number of function elements must equal the desired number of function values in the series.

Decade-type substitution boxes have utilizied switching to interconnect function elements in combinations to provide a number of function values in excess of the number of function elements. For example, resistance elements of 1, 2, 3 and 6 ohms, can be selectively coupled in series to provide an output selectable in unit steps from 1 to 9 ohms. The unit steps lend themselves to additive coupling. However, with geometric-series substitution boxes, the steps between desired values are not unit steps and the art has provided a function element (e.g., a resistor) for each desired output function value.

It is, therefore, a primary object of the present invention to provide a geometric-series substitution box in which a number of function values may be selected from assembled function elements of lesser number.

It is a further object of this invention to provide a geometric-series substitution box which has a desired number of output function values and which can be assembled with fewer function elements and at lower assembly costs than the substitution boxes known to the art.

In accordance with these objects, there is provided in a preferred embodiment of this invention, a substitution box having a rotary switch, said switch having a plurality of index positions. A selected plurality of index positions are primary index positions for the selection of the individual function elements (resistors, capacitors, inductors, and impedances of whatever kind, or combinations thereof). One or more secondary index positions are provided between each adjacent pair of the above mentioned primary index positions.

In the primary index positions, a single function element is coupled across the output terminals. In the secondary index positions, at least two of the function elements are coupled together to provide a predetermined function value at the output terminals, which function value is related to the adjacent primary function values in accordance with a geometric series.

For example, with a rotary switch of the preferred embodiment, alternate index positions of the switch serve as the primary index positions and the function element at each position is coupled across the output terminals. In the intermediate positions, the function elements are interconnected to provide intermediate function values. For example, function elements may be coupled in parallel to provide the desired midpoint value. Additionally, it is desirable to provide elements for serial coupling of function elements for specific values, such as during transition from maximum to minimum values in a rotary switch arrangement.

Having briefly described this invention, it will be decribed in greater detail, along with additional objects and advantages thereof in the following detailed description which may best be understood by reference to the accompanying drawings, of which:

Figures 1, 2, 3, 4, 5, 6:
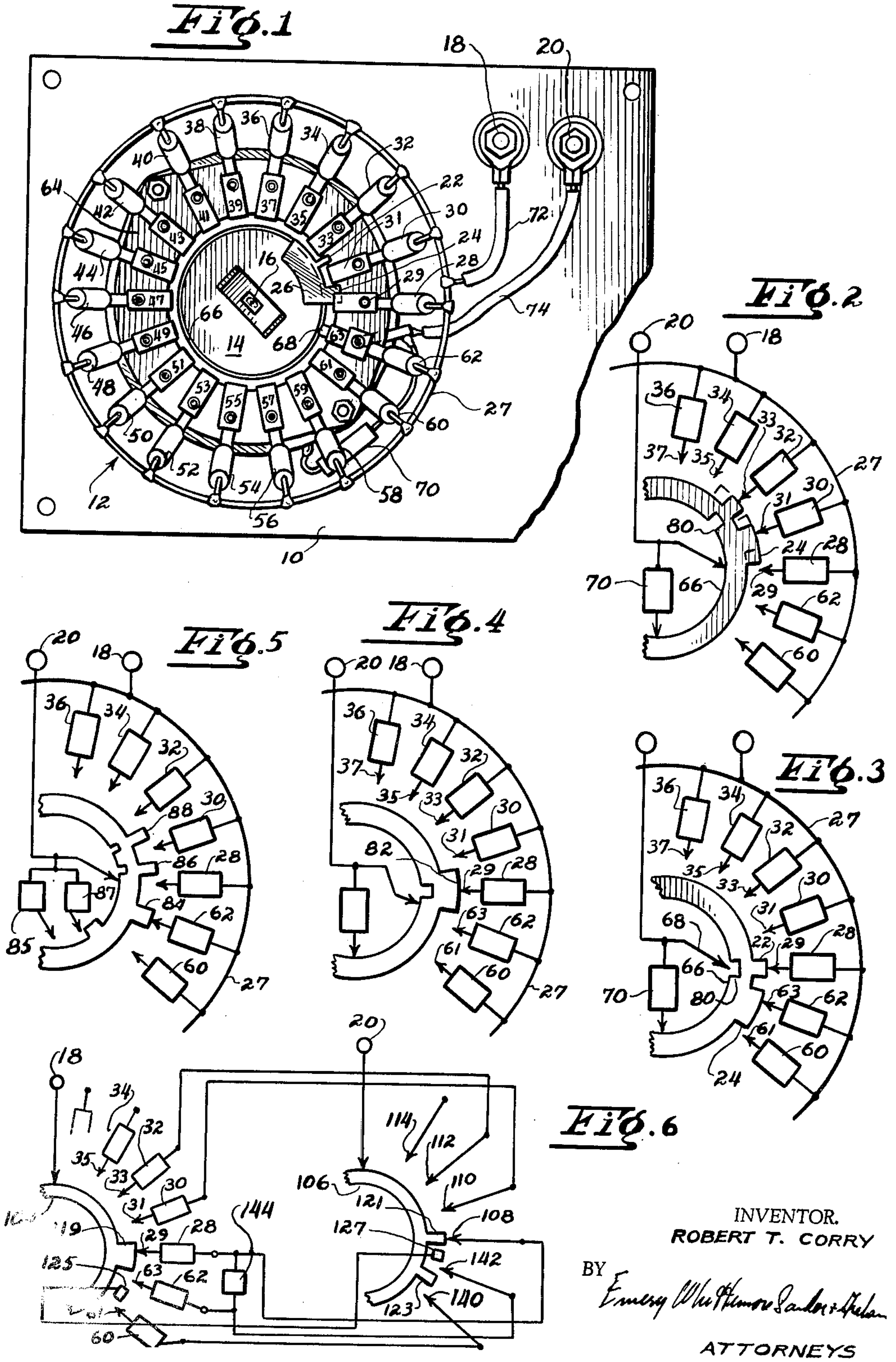
FIG. 1 is a schematic diagram of a 36-step substitution box in accordance with the present invention.
FIGS. 2 and 3 are schematic diagrams of the box of FIG. 1 in different operating positions.
FIGS. 4 and 5 are schematic diagrams of other embodiments of the invention.
FIG. 6 is a schematic diagram of still another embodiment of this invention using serial substitution.

In FIGS. 1–3, there is shown a substitution box 10 comprising a 36-step indexing rotary switch 12 having a wafer rotor 14 rotatably mounted within the switch. The wafer is conveniently rotated by a knob coupled to the central shaft 16 thereof. The knob is positioned on the outside of the box 10 and carries an index line to match scale markings thereby to enable selection of the function values coupled across the output terminals 18, 20. The wafer is indexed at ten-degree increments of rotation (for a 36-step switch) by conventional mechanical detent arrangements. The wafer 14 carries sliding contacts 22 and 24 which are electrically and mechanically joined at the bar 26 mounted on the wafer. Function elements 28, 30, 32, 34, 36, 38, 40, 42, 44, 46, 48, 50, 52, 54, 56, 58, 60, 62 are respectively coupled between a common bus bar 27 and stationary contacts 29, 31, 33, 35, 37, 39, 41, 43, 45, 47, 49, 51, 53, 55, 57, 59, 61, 63. Each stationary contact is positioned at a primary index position (corresponding to twenty degree rotation) and is mounted on a stationary annular wafer 64. A second annular ring contact 66 is provided on the wafter which is electrically coupled to contacts 22, 24 by the mounting studs thereof. A stationary contact 68 is provided to engage the ring contact 66. A function element 70 is provided when the rotary switch is capable of continuous rotation and is coupled between contact 68 and the ring contact 66 through the switch frame. The output terminals 18, 20 are respectively coupled to the bar 27 and the stationary contact 68 by leads 72, 74.

As the switch rotor is turned to successive index positions, different function elements will be coupled across the output terminals. In the position shown in FIG. 1, element 28 will be coupled across the output terminals. As the switch is indexed to the next position, shown in FIG. 2, elements 30, 32 will be coupled in parallel across the output terminals. In the third position, shown in dotted outline, element 30 alone will be coupled across the output terminals. Thus, as the switch is rotated, at each primary index position, a function element will be coupled across the output terminals. At each intermediate position, a parallel combination of elements will be coupled across the terminals. The selection of suitable function values to obtain a geometric series will best be understood by a general theory of the series.

*General theory*

The principle upon which this invention is based is a property of geometric series with certain values of the ratio between consecutive terms. Suppose that resistors, capacitors, inductors, or impedances in general are arranged in a series of increasing impedance values:

$$A, Ar, Ar^2, Ar^3 \ldots Ar^{n-1}, Ar^n$$

where A is the smallest impedance of the series, $r$ is the ratio of any two succesisve impedances, and $n$ is a positive integer. All terms of the series are presumed to have the same phase angle at the operating frequency or frequencies, which may include D.C. The series A, $Ar^2$, $Ar_4 \ldots Ar^{2m}, \ldots$ where $m$ is a positive integer will be referred to hereafter as the even-exponent series, while the series $Ar$, $Ar^3$, $Ar^5, \ldots Ar^{2m-1}, \ldots$ will be referred to as the odd-exponent series.

Conventionally, a selector switch device which is to provide the user with the selection of a chosen value in this series has a separate impedance element for each value that may be chosen. The word impedance is understood to include the cases of pure resistance, capacitative reactance, and inductive reactance, as well as combinations thereof. The purpose of this invention is to make available the same selection of impedance values, but with a reduced number of separate impedance elements, this objective being accomplished by parallel, series, or series-parallel combinations of certain elements to provide values not supplied as individual elements.

As an example, consider the case in which it is desired to obtain the values of the even-exponent series by combinations formed from members of the odd-exponent series. A similar analysis will apply to the inverse problem, forming the values of the odd-exponent series from terms of the even-exponent series. Consider the typical term in the even-exponent series, $Ar^{2p}$, where $p$ is a positive integer or zero, and specify that this impedance is to be formed by parallel combination of the terms $Ar^{2p+1}$ and $Ar^{2p+3}$. If this parallel combination is to be equivalent to the value $Ar^{2p}$, then it is necessary that $$\frac{1}{Ar^{2p}}=\frac{1}{Ar^{2p+1}}+\frac{1}{Ar^{2p+3}}$$

This equation is equivalent to the equation $$Ar^{2p}=Ar^{2p-1}+Ar^{2p-3}$$

which represents the formation of the term $Ar^{2p}$ as a series combination of the two lower-value impedances $Ar^{2p-1}$ and $Ar^{2p-3}$. This shows that interpolation in this series can be achieved equally well by the series combination of the next two lower elements of the primary series (here the odd-exponent terms in the complete series) or by the parallel combination of the next two higher impedance elements of the primary series.

Whichever way the equation is arrived at, the result reduces the equation: $r^3-r^2-1=0$ which has the positive real root $r=1.4656$, approximately. This value of $r$ is quite close to the sixth root of ten, which is approximately 1.4678, the two numbers differing by only about 0.15%. This fact is of special interest because there is a standard series of values for resistance, capacitance, and inductance elements based on rounded-off values of terms in a series having the ratio the sixth root of ten. As an example, consider this set of popular values in the Electronic Industries Assoc. series of preferred values given in their Standard No. GEN-102: 1.0, 1.5, 2.2, 3.3, 4.7, 6.8 and these values multiplied by integral powers of ten. The impedance value of 1.5 ohms can be approximated by a parallel combination of 2.2 and 4.7 ohms, yielding approximately 1.499 ohms, or by a series combination of 0.47 and 1.0 ohm yielding 1.47 ohms. The impedance value 3.3 ohms can be approximated by a parallel combination of 4.7 and 10.0 ohms yielding 3.198 ohms, approximately, or by a series combination of 1.0 and 2.2 ohms yielding 3.2 ohms. The impedance 6.8 ohms can be approximated by a parallel combination of 10.0 and 22.0 ohms yielding 6.875 ohms approximately, and by a series combination of 2.2 and 4.7 ohms yielding 6.9 ohms. It is evident that this discussion will apply equally well to other values where all the values are multiplied by the same constant multiplier, for example, 0.1, 10, 100, or other numbers, not necessarily integral powers of ten.

Since capacitance values bear a reciprocal relation to their impedances, the value 0.15 microfarad would be approximated by a parallel combination of 0.10 and 0.047 microfarad, or by a series combination of 0.22 and 0.47 microfarad. In short, the examples of the preceding paragraph for the approximation of impedances applies equally well to the approximation of capacitance values merely by interchanging the words "series" and "parallel," and replacing the word "impedance" by "capacitance" and the word "ohm" by "microfarad" or some other convenient unit of capacitance value.

In the above examples, it will be noted that the difference between the standard EIA preferred series value and the approximating value does not exceed about 3%. an amount small enough to ignore in many applications. The foregoing sample calculations are merely illustrative, and are not to be construed as limiting the application of this invention.

*Specific embodiments*

Thus, for example, in the embodiment shown in FIGS. 1–3, the series might be a series of resistance values composed of the primary function elements and parallel combinations thereof, as partially set forth in the following table:

| Index Step | Nominal Value Across Output Terminals (ohms) | Function Elements |
|---|---|---|
| 1 | 1.0 | 30 (1.0Ω). |
| 2 | 1.5 | 32 (2.2Ω) in parallel with 34 (4.7Ω). |
| 3 | 2.2 | 32 (2.2Ω). |
| 4 | 3.3 | 34 (4.7Ω) in parallel with 36 (10Ω). |
| 5 | 4.7 | 34 (4.7Ω). |
| 6 | 6.8 | 36 (10Ω) in parallel with 38 (22 ohms). |
| 7 | 10.0 | 36 (10Ω). |

The series shown in the table may then be repeated in decimal multiple groups as desired.

When the switch may be continuously rotated, it is necessary to provide a correction function element at the interpolation step which combines function elements from the two extremes of the function-value range, namely 28 and 62 in this embodiment.

This is best illustrated by FIG. 3 which shows the rotor positioned at the highest interpolated function-value position. Since the parallel combination of elements 28 and 62 in this position does not give the desired interpolating value, a correction is made by providing, in this position only, a serial connection of function element 70, which, in all other positions of the selector switch, is short circuited by the contact of contact 68 wtih the rotor ring 66. The notch 80 cut in the rotor ring removes the short circuit across element 70. The value of the element 70 is selected so that its serial connection with the parallel-connected elements 62 and 28 provide the desired intermediate step between the values of the single elements 60 and 62.

The relative positions and widths of the projections 22 and 24 of FIGS. 1–3 is important if it is desired to place the approximated impedances in their proper places in the main series determined by the primary indexing position. This is accomplished by the arrangement of FIG. 1. In contrast, the arrangement of FIG. 4, in which projection wiper blade is broad, continuous blade 82 provides the same plurality of values, but does not make them available in a monotonic sequence as the switch rotor is turned from position to position.

The foregoing EIA series is considered presently to be the most useful commercial form of the invention, but the principle taught by this invention is not limited to that form. For example, it might be desirable to approximate the omitted values by a parallel combination of elements other than those of the next two higher impedance elements. If the second and third higher impedance elements are selected for this combination, the resulting equation is $$\frac{1}{A}=\frac{1}{Ar^3}+\frac{1}{Ar^5}$$

which reduces to $r^5-r^2-1=0$ which has a positive root at $r=1.1939$, approximately. This results in a series of values more closely spaced than the EIA 1.0, 1.5, 2.2, 3.3, 4.7, 6.8 . . . series; typical values would be approximately 10, 12, 14.5, 17.5, 21, 25, 30, 36, 43, 51, 61, 73, 87, 104. As a practical matter, it would generally be desirable to sacrifice some of the uniformity of geometric ratio between steps to make this series conform to the EIA series of preferred values for the primary indexing positions. The series then becomes approximately: 10, 13.2, 15, 19.4, 22, 27.8, 33, 40.5, 47, 60, 68, 89.2 ,100 and decimal multiples thereof. In this sequence of typical values, the first term and alternate terms thereafter (i.e., the odd-numbered terms) are those obtained by the primary indexing positions selecting individual impedance elements, and the others are obtained by parallel combinations as described above. An embodiment of a switch of this design is shown in FIG. 5 which provides the primary function values by contact 84 and the intermediate values by contacts 86, 88.

As explained above, the interpolating positions requiring corrections to maintain the monotonic series on each side of the transition between the high- and low-impedance ends of the selection range are those positions at the high-impedance end of the range in which the interpolating contacts make contact with contacts of the low-impedance function elements. In FIGS. 1–3, there is only one such position, while in FIG. 5, there are two such positions and two transition function elements 85, 87 are provided.

In general, as can be seen from the above examples, parallel combinations of two or more higher impedance elements can be chosen for the intermediate indexing positions to yield monotonic series of various ratios.

For serial operation in which the function elements are serially coupled in accordance with the general theory, the embodiment shown in FIG. 6 may be advantageously employed.

In FIG. 6, the output terminals are respectively coupled to ring contacts 104, 106. One terminal of the function elements 28, 30, 32 . . . 60, 62 is respectively coupled to the stationary contacts 29, 31, 33 . . . 61, 63. However, the other terminal of function element 28, 30, 32 . . . 60, 62 is respectively coupled to stationary contacts 108, 110, 112 . . . 140, 142. The wafers or ring contacts 104, 106 are coupled for conjoint rotation so that the wiping contacts 119, 125, and 121, 123, 127, respectively will couple the elements serially in accordance with the general theory to provide a geometric series of function values at the output terminals.

The function element 144 corrects the series combinations at the transition as explained in connection with elements 70 of FIGS. 1–3.

This invention may be variously modified and embodied within the scope of the subjoined claims.

What is claimed is:

1. A selector switch arrangment for substiution boxes for providing a predetermined plurality of electrical function values successively related in a geometric series A, Ar, $Ar^2$, . . . $Ar^n$, where $n$ is a positive integer, and in which the function elements comprise the values of alternate terms in the series, as for example, Ar, $Ar^3$, $Ar^5$ . . . , at a pair of output terminals of said switch, comprising a multiposition control switch capable of indexing to a plurality of radially arranged index positions, said switch having a first and second sliding contact in fixed relationship to each other, a plurality of stationnary contacts positioned to be engaged by said sliding contacts as said switch is indexed, the number of said plurality of stationary contacts being less than side predetermined plurality, an electrical function element coupled to each of said stationary contacts, said first contact coupling said electrical function elements to said output terminals in primary index positions, said first and second sliding contacts coupling at least two function elements to said output terminals in intermediate index positions, the primary function values being selected from said geometric series, the intermediate function values being the remaining function values and made up from said coupled function elements.

2. In a selector switch arrangement for substitution boxes to provide a selection of impedances having values in an approximately geometric-series relationship to one another, the ratio of consecutive values being approximately 1.47 to 1, wherein the number of distinct selectable impedance values exceeds the number of impedance elements connected to the switch, a set of impedance elements having values in approximately geometric-series relationship to one another with the ratio of successive values approximately 2.15 to 1, said selector switch having output terminals, said elements each having two terminals, one terminal of each of these elements being connected to a common output terminal of the switch, the other impedance-element terminals being connected in sequence of increasing impedance values to consecutive contacts on the switch so that a primary contact on the relatively movable member of the selector switch makes contact with successive contacts on the stationary member in alternate indexing positions of the moving member as it is progressively moved in one direction, thereby providing in these indexing positions impedance-value selections equal to the values of the corresponding impedance elements, while in the intermediate indexing positions two secondary contacts on the moving member of the switch make contact with the two stationary contacts connected to the two impedance elements having the next two higher impedance values, a slip ring making electrical connection from these moving-member contacts out to the second output terminal and a stationary rubbing contact cooperating therewith, the combined effect in the progressive indexing positions being to provide at the output terminals impedance values which are alternately the values of the impedance elements connected to the switch and interpolating values, obtained by parallel connection of two impedance elements, which are close approximations of the geomertic-means of the values of the impedance elements, selected in adjacent indexing positions, the whole sequence of progressive switch positions providing the user with the choice of a plurality of impedance values which are in an approximately geomertic series relationship with the ratio between the values in consecutive switch positions of approximately 1.47 to 1.

3. In a switch as defined in claim 1, arranged as a rotary switch with an even number of indexing positions dividing the 360 angular degrees of rotation into equal angular increments and employing slip ring-and-rubbing-contact means of bringing out the moving-contacts electrical connection to the second output terminal, the improvement to permit use of all the indexing positions for values of the geometric series in the proper sequence, with only the one discontinuity as the switch is indexed between the highest and lowest impedance values, said improvement consisting of connecting an additional impedance element between the second output terminal and an additional stationary rubbing contact cooperating with the aforementioned slip ring, at least in the position corresponding to selection of the highest required interpolating value, this additional impedance element having a value approximately equal to the aforementioned highest required interpolating value, and a notch in the slip ring so positioned as to break the direct connection of the slip ring to the second output terminal in this position.

References Cited by the Examiner

UNITED STATES PATENTS

| | | | |
|---|---|---|---|
| 2,536,501 | 1/51 | Hood et al. | 200—11 X |
| 2,598,534 | 5/52 | Gordon | 200—11 X |
| 2,760,146 | 8/56 | Wilentchik | 235—197 X |
| 2,876,314 | 3/59 | Jackson | 200—11 X |
| 3,102,951 | 9/63 | Nathan | 235—197 |
| 3,152,228 | 10/64 | Broadhead | 200—11 |

KATHLEEN H. CLAFFY, *Primary Examiner.*

BERNARD A. GILHEANY, *Examiner.*